(12) United States Patent
Nagaishi (10) Patent No.: US 7,065,231 B2
(45) Date of Patent: Jun. 20, 2006

(54) IMAGE EVALUATION METHOD, SYSTEM, AND PROGRAM BASED ON IMAGE SENSITIVITY USING INDUCTION-FIELD ENERGY

(75) Inventor: Michihiro Nagaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 565 days.

(21) Appl. No.: 10/192,616

(22) Filed: Jul. 11, 2002

(65) Prior Publication Data

US 2003/0086618 A1    May 8, 2003

(30) Foreign Application Priority Data

Jul. 13, 2001    (JP)    ............... 2001-213425

(51) Int. Cl.
*G06K 9/00*    (2006.01)
(52) U.S. Cl. ...................................... 382/112; 382/276
(58) Field of Classification Search ................ 382/229, 382/108, 112
See application file for complete search history.

(56) References Cited

U.S. PATENT DOCUMENTS

| 5,845,020 A | 12/1998 | Nagaishi |
| 6,330,358 B1 | 12/2001 | Nagaishi |
| 2003/0086619 A1 * | 5/2003 | Nagaishi ..................... 382/229 |

OTHER PUBLICATIONS

Yokose, Zensho, "A Study of Character-Patterns Based Upon the Theory of Psychological Potential Field", Japanese Pychological Research, vol. 12 No. 1, pp. 18-25, 1970.*

Li, Ming-Jing; Dai, Ru-Wei, "The Field Transform and its Application to Personal Handwritten Chinese Character Recognition", IEEE, 1995.*

Nagaishi, Michihiro, "Evaluation of Sensibility using Induction Field in Vision", Cognitive Studies, pp. 326-333, Jun. 2003.*

Miyoshi et al., "Character Arrangement Design with Kansei Information by Using the Theory of Induction Field on Retina", IEICE Transactions, vol. 82-A, No. 9, pp. 1465-1473 (1999).*

Motokawa, K, "Field of Retinal Induction and Optical Illusion", Neurophysiology, 13, pp. 413-426, 1950.*

(Continued)

*Primary Examiner*—Jingge Wu
*Assistant Examiner*—Jordan Kuhn
(74) *Attorney, Agent, or Firm*—Oliff & Berridge, PLC (57) ABSTRACT

The invention performs automatic evaluation based on sensitivity of an image that, in the related art, is performed by using the sensibility and the manual work of a person. The invention provides an image-for-evaluation input device to input an image for evaluation, an induction-field-in-vision calculation device to calculate the induction field in vision of the image input to the image-for-evaluation input device, and an image-evaluation-based-on-sensitivity device to perform evaluation based on sensitivity of the image based on a potential value obtained by the induction-field-in-vision calculation device. The image-evaluation-based-on-sensitivity device includes an induction-field-energy calculation device, calculates an induction-field energy based on the result obtained by the induction-field-in-vision calculation device, and performs the evaluation based on sensitivity of the image according to the magnitude of the energy.

9 Claims, 9 Drawing Sheets

OTHER PUBLICATIONS

Ohashi et al., "Text-Independent Writer-Recognition Method using Feature Extraction by induction field in Vision", vol. 54, No. 9, pp. 1305-1310, 2000.*

Nagaishi, Michihiro, "Identifying Ability of a Recognition Method Based on the Field of Induction", IEEE, 1993.*

Nagaishi, "Legible Display of Japanese Characters based on Induction Filed in Vision", The Journal of the Institute of Image Information and Television Engineers, vol. 52, No. 12, pp. 1865-1972 (1998).

Miyoshi et al., "Character Arrangement Design with Kansei Information by Using the Theory of Induction Field on Retina", IEICE Transactions, vol. 82-A, No. 9, pp. 1465-1473 (1999).

Yokose, Psychology of Shapes, Nagoya University Press, 1st Ed., pp. 50-100, Jul. 15, 1986 (Japanese and English Versions).

Oshiki, Tentative Assumption Concerning Basis of Handwriting Education from Viewpoints of Versatility and Rationale, Joetsa University of Education, pp. 1-33 (Japanese and English Versions).

Oshiki et al., Research Concerning Character Shape of Kanji Comprised of Left & Right Radicals (1), Academic Journal of Shosha-Shoda (Handwriting and calligraphy) Education: "Research . . . Education" No. 10, pp. 1-26 (Japanese and English Versions).

* cited by examiner

あ あ あ あ あ あ あ あ あ あ あ あ
FONT  F1  F2  F3  F4  F5  F6  F7  F8  F9  F10 F11 F12

$$M_p = \frac{1}{n}\sum_{i}^{n}\frac{1}{r_i} \qquad (1)$$

FIG. 10

$$E = \sum_{i}^{n} S_i \times P_i \qquad (2)$$

IMAGE EVALUATION METHOD, SYSTEM, AND PROGRAM BASED ON IMAGE SENSITIVITY USING INDUCTION-FIELD ENERGY

BACKGROUND OF THE INVENTION

1. Field of Invention

The present invention relates to an image-evaluation method, an image-evaluation system, and an image-evaluation-processing program that perform evaluation based on sensitivity, such as a determination of the strength of an impression of text, a photograph, a picture, a drawing, and so forth (collectively referred to as "an image").

2. Description of Related Art

When displaying an image including, e.g., text, a photograph, a picture, and a drawing in a limited display area, such as the display screen of an information apparatus, a signboard, or a poster, it is important to display the image by using a layout that everyone or many people can clearly and easily understand. However, in addition to the layout, considering the strength of an effect on the sensibility of a person, e.g., considering the strength of an impression that the image has on a viewer is very important.

In the related art, in order to increase the strength of the effect on the sensitivity of a person (hereinafter "impression strength"), image selection can be performed according to varying objects. For example, text printed in thick Gothic type is used in titles of an article of a newspaper, a magazine, and so forth, and a drawing or a picture that has a strong impression is used in a poster.

In the related art, in order to make a high-impact display, an expert designer can determine which font should be used for text in a certain part of the display, what type of a picture should be used for that or another part of the display, and so forth. This is because it is difficult to determine the impression strength by quantity. Therefore, it is difficult to automatically make these determinations via a computer or the like.

For example, there are many text fonts, which are selected and used according to instances or purposes. It is difficult to mechanically select and use the text fonts. However, since the text of the same Gothic type of font can have different typefaces, the degree of the impression strength of the text varies slightly. Although a person, such as the designer, can determine such slight differences, it is difficult to perform such determinations automatically or mechanically.

If each font has an attribute for the degree of the impression strength, it may be considered that the fonts can be selected and used mechanically to some extent according to the instance. However, since there are many fonts and text types, such an idea is not realistic.

The above-described case can be applied not only to text, but also to a picture, a photograph, a drawing, and so forth. Since there is no appropriate reference by which the degree of the impression strength of the picture, the photograph, and the drawing is measured, it is more difficult to determine the degree of the impression strength by quantity than in the case of the text.

SUMMARY OF THE INVENTION

Accordingly, the present invention performs a determination of the degree of the impression strength of the images by quantity, which is the index of the evaluation based on sensitivity of the image including the text, the photograph, the picture, the drawing, and so forth, and performs the evaluation based on sensitivity of the image automatically. In the related art, such an evaluation based on sensitivity of an image relies upon the sensibility and the manual work of a person.

According to an image-evaluation method of the present invention to perform evaluation based on sensitivity of an image for evaluation, an induction field in vision of the image for evaluation is calculated, and the evaluation based on sensitivity of the image for evaluation is performed on the basis of the magnitude of a potential value obtained from the calculated induction field in vision.

In the image-evaluation method, processing to perform the evaluation based on sensitivity based on the magnitude of the potential value includes: obtaining induction-field energy on the basis of the potential value, and performing the evaluation based on sensitivity of the image for evaluation according to the magnitude of the induction-field energy.

The induction-field energy based on the potential value is obtained by multiplying the area of a plane surrounded with an equipotential line that is obtained from the induction field in vision, by the potential value of the equipotential line, performing the calculation for each equipotential line, and obtaining the total sum of the calculation.

According to the image-evaluation method, processing to perform the evaluation based on sensitivity of the image for evaluation further includes: obtaining the induction-field energy, comparing the obtained induction-field energy with a predetermined reference induction-field energy, and performing the evaluation based on sensitivity of the image for evaluation based on the comparison result.

An image-evaluation system of the present invention to perform evaluation based on sensitivity of an image for evaluation includes: an induction-field-in-vision calculation unit to calculate an induction field in vision of the image for evaluation, and an image-evaluation-based-on-sensitivity unit to perform the evaluation based on sensitivity of the image for evaluation on the basis of the magnitude of a potential value obtained from the induction field in vision obtained by the induction-field-in-vision calculation unit.

In the image-evaluation system, processing performed by the image-evaluation-based-on-sensitivity unit to perform the evaluation based on sensitivity on the basis of the magnitude of the potential value includes: obtaining the induction-field energy on the basis of the potential value, and performing the evaluation based on sensitivity of the image for evaluation according to the magnitude of the induction-field energy.

The induction-field energy based on the potential value is obtained by multiplying the area of a plane surrounded with an equipotential line, which is obtained from the induction field in vision, by the potential value of the equipotential line, performing the calculation for each equipotential line, and obtaining the total sum of the calculation.

In the image-evaluation system, processing performed by the image-evaluation-based-on-sensitivity unit to perform the evaluation based on sensitivity of the image for evaluation includes: obtaining the induction-field energy for the image for evaluation, comparing the obtained induction-field energy with a predetermined reference induction-field energy, and performing the evaluation based on sensitivity of the image for evaluation on the basis of the comparison result.

An image-evaluation-processing program of the present invention to perform evaluation based on sensitivity for an image for evaluation includes: calculating an induction field in vision of the image for evaluation, and performing the evaluation based on sensitivity of the image for evaluation on the basis of the magnitude of a potential value obtained from the induction field in vision.

In the image-evaluation-processing program, the processing to perform the evaluation based on sensitivity based on the magnitude of the potential value includes: obtaining the induction-field energy based on the potential value, and performing the evaluation based on sensitivity of the image for evaluation according to the magnitude of the induction-field energy.

The induction-field energy based on the potential value is obtained by multiplying the area of a plane surrounded with an equipotential line, which is obtained from the induction field in vision, by the potential value of the equipotential line, performing the calculation for each equipotential line, and obtaining the total sum of the calculation.

According to the image-evaluation-processing program, processing to perform the evaluation based on sensitivity of the image for evaluation includes: obtaining the induction-field energy for the image for evaluation, comparing the obtained induction-field energy with a predetermined reference induction-field energy, and performing the evaluation based on sensitivity of the image for evaluation on the basis of the comparison result.

Thus, the present invention calculates the induction field in vision of an image for evaluation, and performs evaluation based on sensitivity of the image based on the magnitude of a potential value obtained from the calculated induction field in vision. Therefore, the impression strength of the image, which is the index of the evaluation based on sensitivity, can be expressed by quantity. Therefore, the image evaluation can be used for many fields, e.g., optimization of the text font design and the design of the drawing and the picture, which have been performed by using the sensibility and the manual work of a person, or evaluation of image quality, which is performed after image processing, such as edge enhancement or gamma correction.

Further, the energy of the induction field is calculated based on the potential value, and the evaluation based on sensitivity of the image for evaluation is performed corresponding to the magnitude of the induction-field energy. Therefore, the degree of the impression strength of the image, which is the index of the evaluation based on sensitivity, can be properly expressed.

The energy of the induction field on the basis of the potential value is obtained by multiplying the area of a plane surrounded with a equipotential line, which is obtained from the induction field in vision, by the potential value of the equipotential line, performing the calculation for each of the equipotential lines, and obtaining the total sum of the calculation. Thus, the energy of the induction field can be determined by simple calculation.

Further, processing of the evaluation based on sensitivity of the image for evaluation includes: obtaining the induction-field energy of the image for evaluation, comparing the obtained induction-field energy with a predetermined reference induction-field energy, and performing the evaluation based on sensitivity of the image corresponding to the comparison result. Incidentally, the reference induction-field energy can be freely set according to what kind of processing is performed for the image for evaluation.

Thus, efficient and appropriate evaluation based on sensitivity can be performed without using the sensibility and manual work of a person, according to the use of the image for evaluation.

For example, when the image for evaluation is text that is used for a certain document, such as a poster, a reference induction-field energy value corresponding to such a case is set, and processing to compare an induction-field energy value that is calculated for text of some font with the reference induction-field energy value is performed. If the value does not reach the reference value after the processing was performed once, the font can be changed and the processing can be repeated. Subsequently, the font that is most suitable for the document can be determined. Further, as described above, when performing evaluation of the image that was subjected to the image processing, such as edge enhancement, gamma correction, and so forth, the quality of the image can be properly evaluated by setting the reference value corresponding thereto and comparing an induction-field energy value calculated for the image that was subjected to the image processing with the reference induction-field energy value.

BRIEF DESCRIPTION OF THE DRAWINGS

FIGS. 3(a) and 3(b) are schematics that show examples of the induction field in vision of text "A", where FIG. 3(a) shows an example where the induction field in vision is obtained in consideration of the shielding condition, and FIG. 3(b) shows another example where the induction field in vision is obtained without consideration of the shielding condition;

DETAILED DESCRIPTION OF PREFERRED EMBODIMENTS

Exemplary embodiments for carrying out the present invention are described below. The details described in these exemplary embodiments cover an image-evaluation method and an image-evaluation system of the present invention, and specific details of the processing performed according to an image-evaluation-processing program of the present invention.

The present invention uses "induction field in vision" concepts for evaluation based on sensitivity of an image (text, a picture, a photograph, a drawing, and so forth). The induction field in vision is briefly described below.

The induction field in vision is used as the index of the readability of a text string by performing, for example, evaluation of the readability of text on the text string.

First, as an example of making an estimate of an induction field in vision of a text image on the basis of knowledge of physiology and psychology, a method of making an estimate of the induction field in vision of a digital text image obtained by electronization is described below.

When each character of the text string is readable, the induction fields surrounding the characters are disposed so that they do not interfere with each other as far as possible. More specifically, when the potential value of a closed curve of the induction field in vision that surrounds the characters is high, each character is hardly separated from the other and is not readable. Therefore, it is considered that the readability of each character of the text string can be evaluated by quantity with reference to the expansion of the induction field in vision. Incidentally, the induction field in vision is described in "The Psychology of Shape" written by Zensho Yokose (Nagoya University Press Association (1986)) (hereinafter "a reference paper").

The induction field in vision described in the reference paper (hereinafter "an induction field") describes a visual phenomenon by considering a "field" that has a fringing effect around a drawing. The reference paper concerns a drawing including lines and arcs. Therefore, the induction field of an arbitrary digital image cannot be obtained. A method of calculating the induction field of a digital image of white/black binary values is described below.

Basically, the induction field is equivalent to a Coulomb potential. Therefore, assuming that pixels forming the edge of a pattern are point charges, the distribution of the induction field of the digital image is calculated by using the density of the Coulomb potential due to the point charges.

Figure 1:
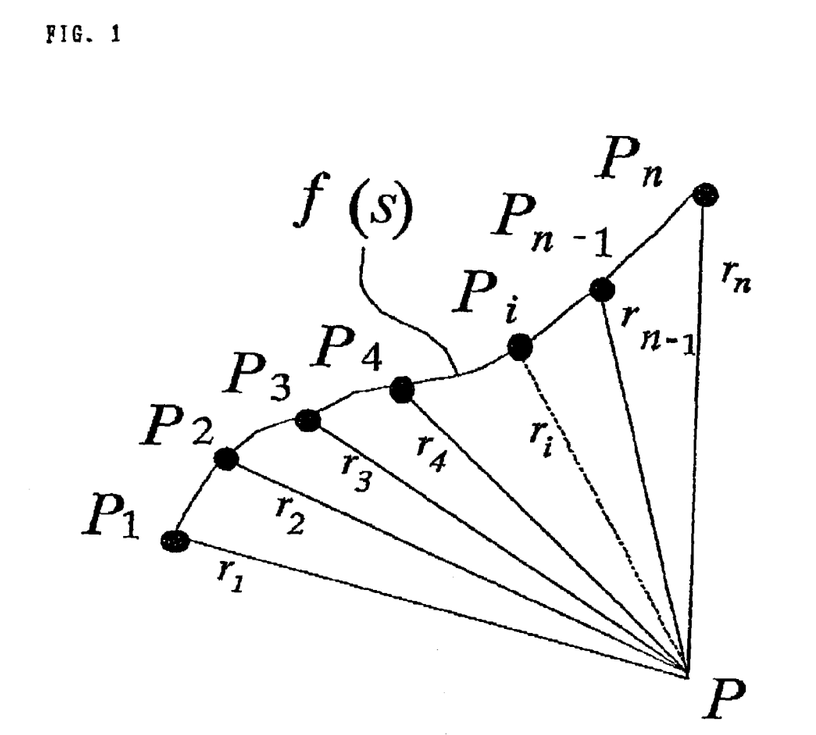
FIG. 1 is a schematic that shows the pixel array of a digital image illustrating an induction field in vision that is used for the present invention.
Figure 9:
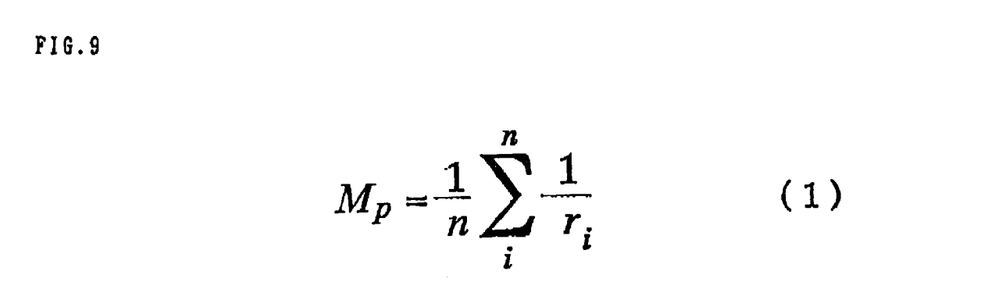
FIG. 9 is an expression (1) to obtain the strength Mp of the induction field at the point P shown in FIG. 1.

FIG. 1 illustrates the pixel array of a digital image. As shown in FIG. 1, an induction field is formed at an arbitrary point P by the curve f(S) that is formed by a sequence of n points. The curve f(S) corresponds to the line segment of a drawing, or the edge of a picture. Assuming that points $P_1$, $P_2$, ..., $P_i$, ..., $P_n$ forming the curve f(S) have +1 electric charge, a scan is performed from the point P over the curve f(S). When the n points including $P_1$, $P_2$, ..., $P_i$, ..., $P_n$ forming the curve f(S) are found, and the distances to the points, which are found on the curve f(S) by the scan, are $r_i$, the strength $M_p$ of the induction field at the point P is defined as shown by expression (1) in FIG. 9.

Figure 2:
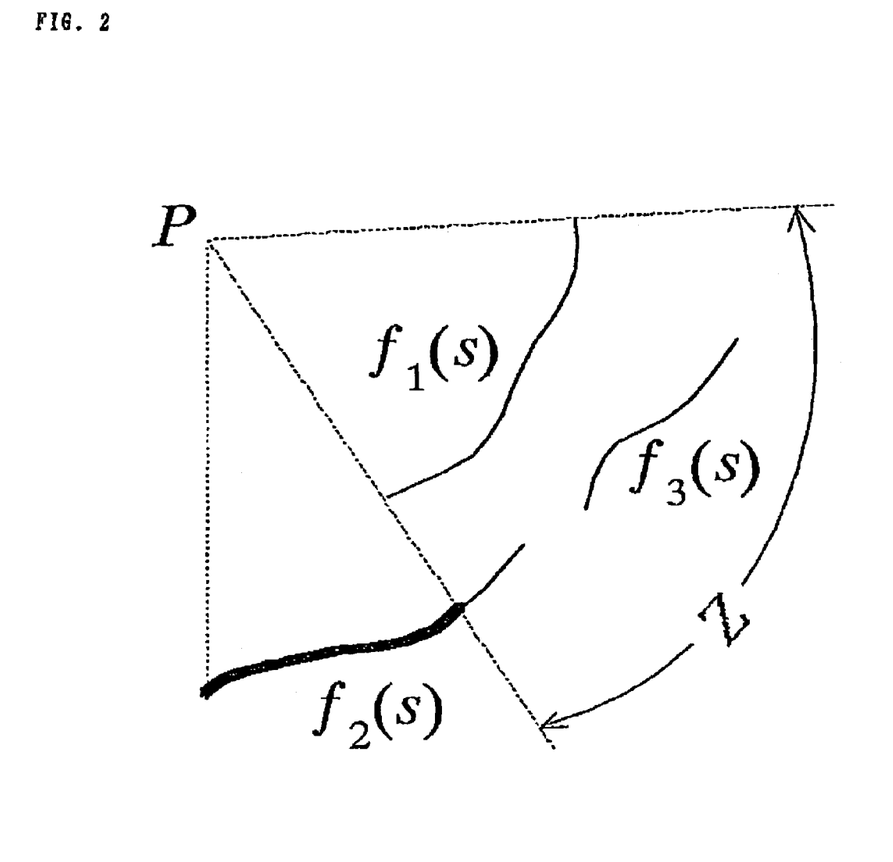
FIG. 2 is a schematic that illustrates the shielding condition when the magnitude of the induction field in vision is calculated.

By using expression (1), the induction field of an arbitrary digital image can be obtained. When there is a plurality of curves, the strength of the induction field at the point P is obtained by calculating the sum of the induction fields made by the curves at the point P. Expression (1) can be applied only to the segment from which the point P can be viewed. In FIG. 2, curve $f_3(S)$ and some parts of $f_2(S)$ do not comtribute in creating the induction field. That is to say, the sum for the area Z that cannot be seen from the point P because it is shielded by the curve $f_1(S)$ is not calculated. In the example of FIG. 2, the sum of the whole curve $f_3(S)$ and part of the curve $f_2(S)$ is not calculated. This is referred to as the shielding condition.

Figure 3:
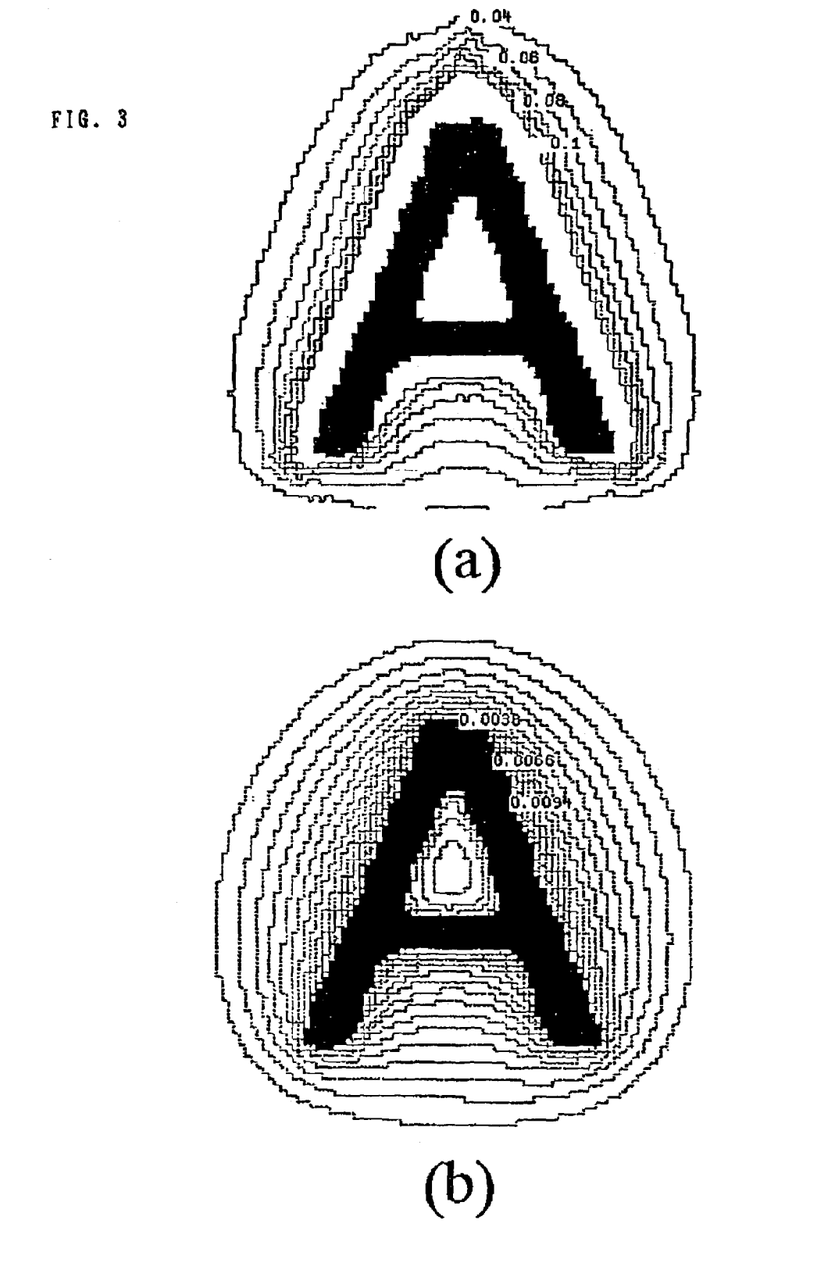

FIG. 3(a) shows an exemplary induction field calculated by using expression (1) for text "A". The thin lines L that are distributed around the text "A" shown in FIG. 3(a) like contour lines of a map are equipotential lines that are drawn by uniting the equipotential value in the induction field. The magnitude of the induction fields (the potential value) becomes lower as it approaches the outside from the central, and gradually approaches zero.

The characteristic of the shape and the magnitude of the distribution of the induction fields in FIG. 3(a) and particularly the characteristic of the distribution near the top of the "A", the distribution being sharper than others, match the result of a psychology experiment for the distribution of induction field near an angle of a drawing, such as a quadrangle or a triangle as described in the reference paper.

FIG. 3(b) shows an exemplary induction field provided on the assumption that all the pixels have +1 electric charge 1 without the shielding condition (the sum in the area Z, which cannot be seen from the arbitrary point P, is not calculated). The distribution of the induction field becomes round on the whole, which is different from the result of the psychology experiment described in the reference paper. Thus, the shielding condition is important to characterize the induction field.

As described above, the induction field of text can be obtained. Incidentally, there are exemplary technologies using the induction field in vision, such as Michihiro Nagaishi: Readable Proportional Display for Japanese using Induction Field in Vision", THE JOURNAL OF THE INSTITUTE OF IMAGE INFORMATION AND TELEVISION ENGINEERS, Vol. 52, No. 12, pp. 1865–1872 (1998)" (hereinafter "a first paper") and "Masazumi Miyoshi, Yoshifumi Shimojio, Hiroaki Koga, Ken Ideguchi: Design of Character Arrangement on the basis of Sensibility by using Induction Field in Vision Theory", IEICE TRANSACTIONS, 82-A, 9, 1465–1473 (1999)" (hereinafter "a second paper"). Incidentally, the author of the first paper is the inventor of the present invention.

By using such an induction field in vision, the present invention performs evaluation based on sensitivity of an image by indicating the impression strength of the image, such as a photograph, a picture, a drawing, and so forth by quantity. Due to the evaluation, the present invention mechanically determines which image (e.g., which font should be used for text when the image is text) is the most suitable without manual work corresponding to the use, or performs the evaluation based on sensitivity of the quality of the image mechanically and without manual work as in the above-described case.

When such an evaluation based on sensitivity of the image is performed, the image for evaluation is considered as a target for induction field calculation. Then, the induction field is calculated, and the magnitude of the induction-field energy is calculated on the basis of the obtained potential value. The magnitude of the induction-field energy is used as the degree of the impression strength of the image for evaluation. According to the degree obtained thereby, the evaluation based on sensitivity of the image is performed.

There were several examples suggesting the possibility of using the induction field for the evaluation based on sensitivity of an image, for example, determination of the beauty of hand written characters, such as in Oshiki, "An Essay on the Basics of Handwriting Education in terms of General Versatility and Rationality", Shosha-Shodo "Education Research," Vol. 14 (March 2000), or Oshiki and Okamoto, "Research on the Shape of Chinese Characters comprising Left Parts and Right Parts (1)—The Sense and Elements with reference to the Size in the Vertical direction", Shosha-Shodo Education Research, Vol. 10 (March 1996). These publications mainly discuss the quality of a character, such as the balance of a character. Therefore, these publications are very different from the art that the present invention is intended to achieve, that is, the art of performing evaluation based on sensitivity of an image for evaluation by determining the degree of the impression strength of the image by quantity corresponding to the energy of an induction field. Exemplary embodiments to carry out the present invention are described below.

First, when the font of text is changed in various ways, an example where the degree of impression of the fonts is determined by quantity is described.

Figure 4:
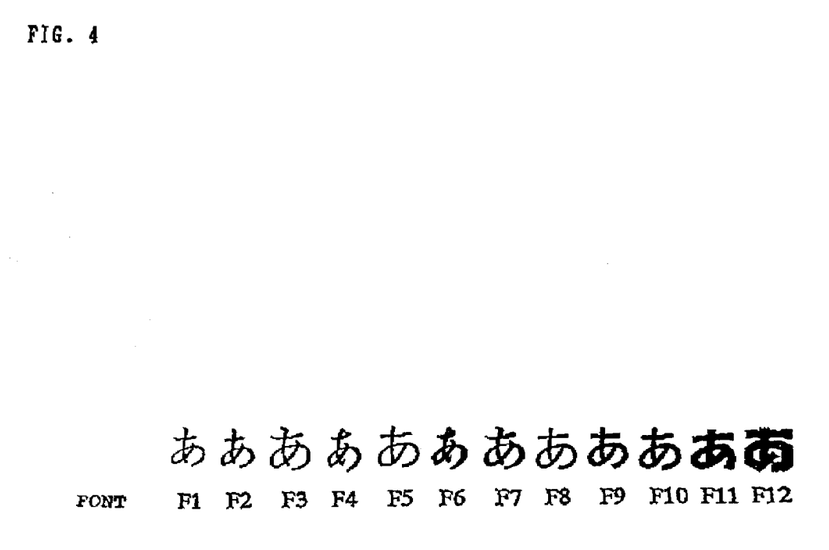
FIG. 4 is a schematic that shows an example where the font of Japanese hiragana character corresponding to "a" is changed in various ways.

FIG. 4 shows an example where the font of a Japanese hiragana character that corresponds to "a" is changed in various ways. In this example, the size of the fonts are standardized at 62 point (72 dpi), and only the font type is changed. In this example, there are twelve types of fonts, which are shown as fonts F1, F2, ..., F12 from the left. An induction-field energy for the character "a" is obtained for each font.

Figure 10:
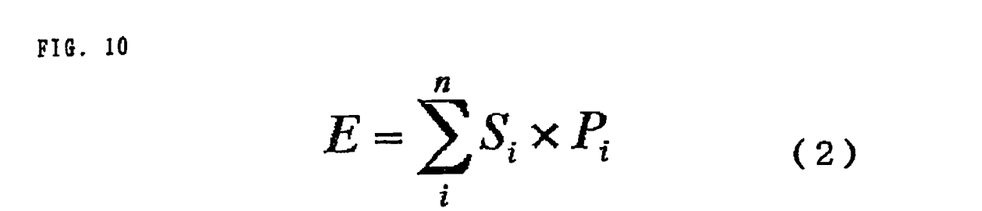
FIG. 10 is an expression (2) to obtain the magnitude E of the energy of an induction field.

If the magnitude of the induction-field energy is indicated by E, the E can be calculated by using expression (2) shown in FIG. 10.

In expression (2), i indicates No. i equipotential line that was calculated by using expression (1), Si indicates the area of the plane surrounded by No. i equipotential line, and Pi indicates the potential value of No. i equipotential line. When considering the induction field three-dimensionally, expression (2) represents obtaining the volume of the induction field. The volume of the induction field is the magnitude of the energy.

Figure 5:
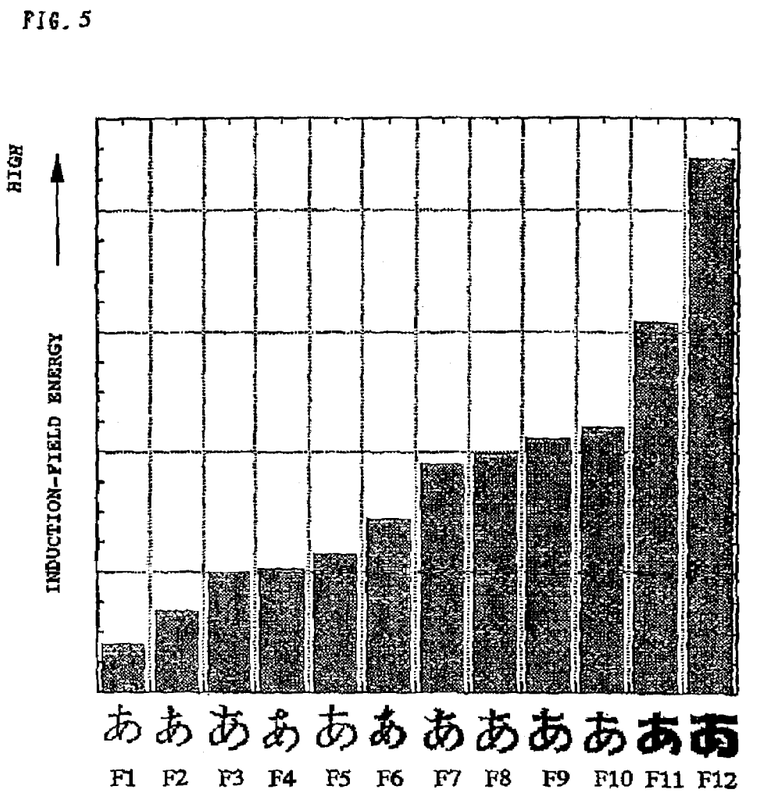
FIG. 5 is a graph that illustrates the induction-field energy of the fonts shown in FIG. 4.

By using expression (2), regarding each "a" shown in FIG. 4 as an image, the induction-field energy for each "a" is obtained as shown in FIG. 5. In FIG. 5, the twelve fonts F1, F2, ..., F12 for the text "a" are shown along the horizontal axis, and the magnitude of the induction-field energy for the fonts F1, F2, ..., F12 is shown along the vertical axis.

As is clear from FIG. 5, the induction-field energy of "a" that is expressed by thin lines and is visually fine is low, and the induction-field energy of "a" that is expressed by thick lines and is visually strong is high. Particularly, the induction-field energy of the Japanese hiragana character "a" using the font F1 and the Japanese hiragana character "a" using the font F2, which are expressed in Mincho by using thin lines, is low. The induction-field energy of the "a" using the font F1 and the "a" using the font F12, which are expressed in Gothic-style by using thick lines that are often provided in titles of posters, is high. As for the fonts F2, F3, and F4, all of which are the same Mincho, the images thereof are rather indistinguishable since the thicknesses of the lines are almost the same as each other. However, by referring to the induction-field energy, it becomes possible to quantitatively distinguish the visual fineness.

Accordingly, the magnitude of the induction-field energy can be used as an index that indicates the degree of the impression strength of a text font. In other words, it is considered that the impression strength of the font can be expressed by quantity by using the induction-field energy.

Thus, the relation between the magnitude of the induction-field energy corresponding to the font types of text and the degree of the impression strength for the font types is considered above. However, the same consideration can be applied not only for the text font but also for a typical image.

Figure 6:
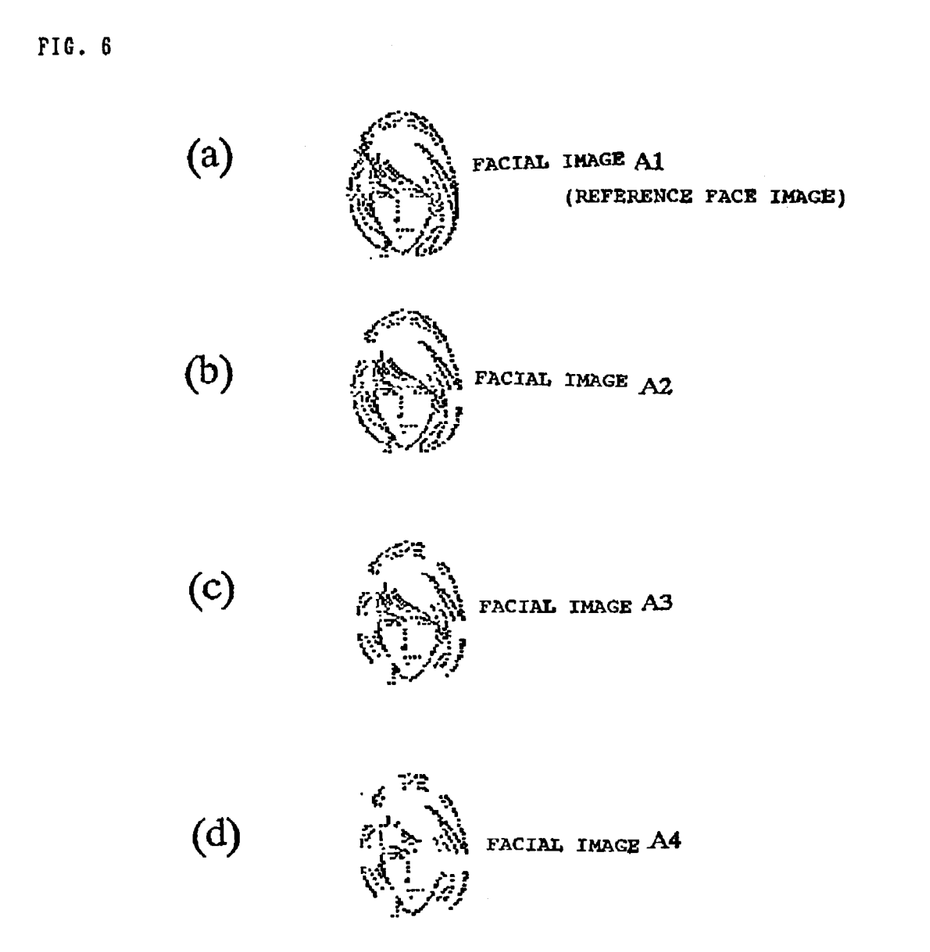
FIGS. 6(a)–6(d) are schematics that illustrate a reference facial image and facial images, where the degree of degradation of the facial images is gradually increased compared to that of the reference facial image.

FIGS. 6(a)–6(d) illustrates facial images each having modified image quality. FIG. 6(a) is a reference facial image having good image quality (referred to as a facial image A1). FIGS. 6(b) to 6(d) illustrate images that are the same as the reference facial image A1 except that the pixels thereof are gradually lost. The loss is increased as the image progresses from the facial image shown in FIG. 6(b) (referred to as a facial image A2), to the facial image shown in FIG. 6(c) (referred to as a facial image A3), and to the facial image shown in FIG. 6(d) (referred to as a facial image A4). Therefore, the quality of the facial images is decreased and the impression becomes weak.

Figure 7:
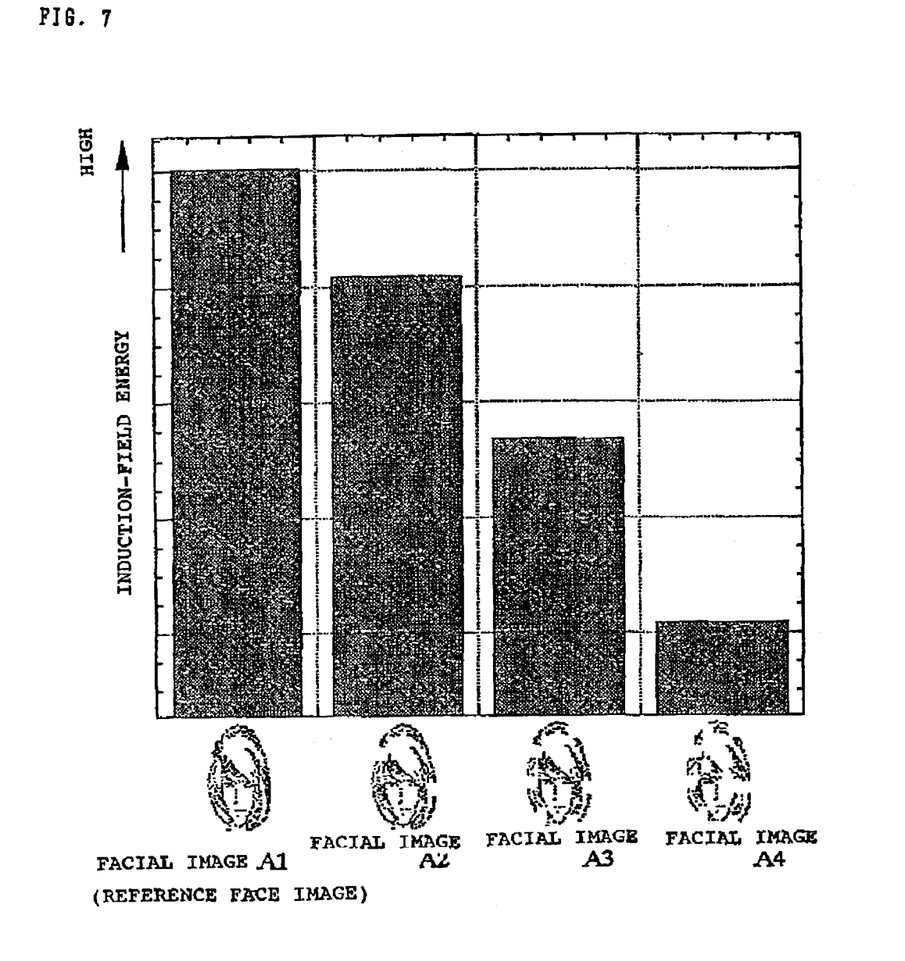
FIG. 7 is a graph that illustrates the induction-field energy of the facial images shown in FIGS. 6(a)–6(d)

The facial images A1 to A4 shown in FIGS. 6(a) to 6(d) are used as images for evaluation. Therefore, the induction field for each image is calculated by using expression (1). By using an equipotential line that is drawn by the calculation, an induction-field energy is each calculated by using expression (2). The results are shown in FIG. 7. Incidentally, to calculate the induction field by the facial images A1 to A4, the size of the facial images is normalized.

In FIG. 7, the facial images A1 to A4 are shown on the horizontal axis, and the induction-field energy, which is obtained for each of the facial images A1 to A4 are shown on the vertical axis. According to FIG. 7, the energy of the reference facial image A1 with good image quality is the highest. As for the three other facial images A2, A3, and A4, the losses of the images are high compared to that of the reference facial image A1, and therefore the impressions thereof are weak. As the losses increase and the impressions become weaker, the value of the induction-field energy decreases.

As described above, there is a correspondence between the degree of the impression strength of an image, such as text, a drawing, a picture, and a photograph, and the magnitude of an induction-field energy. Subsequently, the degree of the impression strength of the image can be expressed by quantity by using the induction-field energy. Accordingly, the evaluation based on sensitivity of the image can be performed.

The image for evaluation may be text, a drawing, a picture, a photograph, and so forth. A unit of images may include not only text, a drawing, a picture, or a photograph, but also a combination of several types of text, or a combination of a drawing, a picture, and a photograph. Further, the unit of images may include a combination of text, a drawing, a picture, and a photograph. For the unit of images, the induction field is each calculated. Accordingly, the induction-field energy can be obtained by using expression (2).

Figure 8:
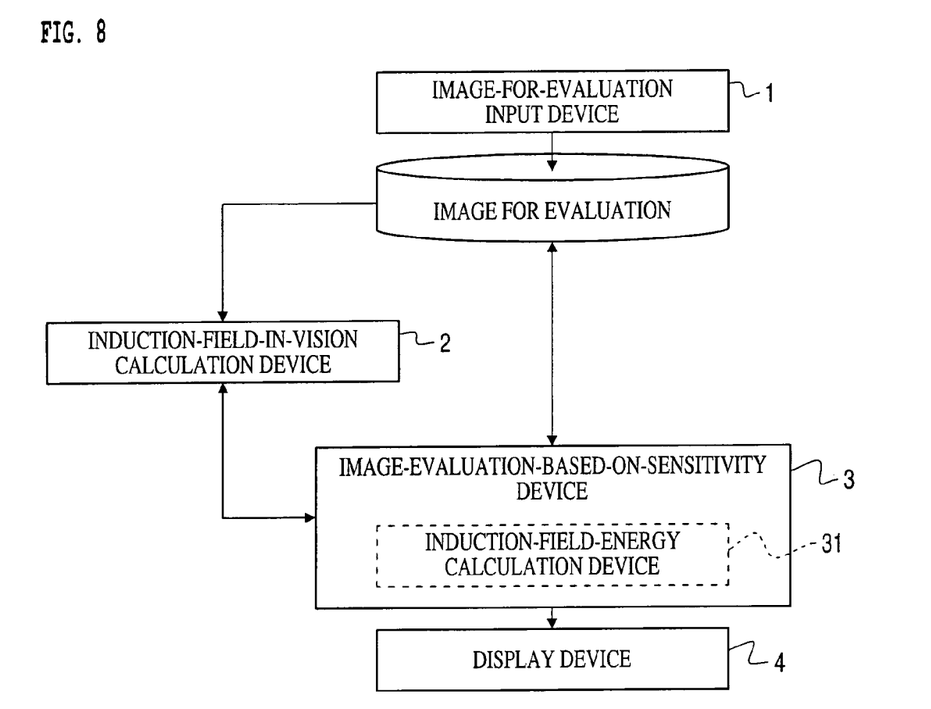
FIG. 8 is a flowchart that illustrates the schematic configuration of an image-evaluation system according to a mode of the present invention.

FIG. 8 illustrates the schematic configuration of an image-evaluation system of the present invention. The system calculates the above-described induction field, calculates an induction-field energy from the calculated induction field, and thereby achieves the evaluation based on sensitivity of an image.

As shown in FIG. 8, the image-evaluation system includes an image-for-evaluation input device 1 to input an electronized image for evaluation, an induction-field-in-vision calculation device 2 to calculate the induction field in vision of an image for evaluation of images that are input to the image-for-evaluation input means 1 by using expression (1), an image-evaluation-based-on-sensitivity device 3 to perform the evaluation based on sensitivity on the basis of the potential value obtained from the induction field in vision that is calculated by the induction-field-in-vision calculation device 2, and a display 4.

The image-evaluation-based-on-sensitivity device 3 includes an induction-field-energy calculation device 31 to calculate an induction-field energy by using the result calculated by the induction-field-in-vision calculation device 2 according to expression (2). The image-evaluation-based-on-sensitivity device 3 calculates the induction-field energy according to expression (2), and performs the evaluation based on sensitivity of the image based on the induction-field energy.

As an example of processing for the evaluation based on sensitivity of an image by using such an image-evaluation system, the induction-field energy for an image for evaluation is obtained. The obtained induction-field energy is compared with a reference induction-field energy, and the evaluation based on sensitivity of the image is performed based on the comparison result.

For example, when the image for evaluation is text that is used for some document, such as a poster, a reference induction-field energy value corresponding to the text is set, processing is performed to obtain the induction-field energy of the image for evaluation (text in some font), and the value of the obtained induction-field energy is compared with the value of the reference induction-field energy.

When the value of the obtained induction-field energy is lower than the value of the reference induction-field energy, it means that the impression of the font is low and such text is not suitable to be used in the document. Then, another font that has an increased impression is selected, and the induction field thereof is calculated likewise. Then, the value of the calculated induction-field energy is compared with the value of the reference induction-field energy.

Subsequently, it becomes possible to mechanically determine the font design of text, the design of a drawing, a picture, and so forth, which are determined by an expert designer in the related art, by using computer or the like.

Further, as described above, the evaluation based on sensitivity can also be performed to evaluate the quality of an image that was subjected to image processing, such as edge enhancement, gamma correction, and so forth.

In such a case, the value of a reference induction-field energy corresponding to such a case is set, and processing to obtain the induction-field energy for the image (such as text or drawing) for evaluation, which was subjected to the image processing, is performed. Then, the value of the obtained induction-field energy is compared with the value of the reference induction-field energy.

When the value of the obtained induction-field energy is lower than the value of the reference induction-field energy, it can be determined that the image quality was not enhanced enough by the image processing. On the other hand, when the value of the obtained induction-field energy is higher than the value of the reference induction-field energy, it can be determined that the image quality was properly enhanced by the image processing.

Thus, by using the present invention, it becomes possible to reduce variation in image-evaluation result due to the personality of workers, to perform evaluation of image quality properly, and to reduce time required for the evaluation substantially.

The present invention is not limited to the above-described exemplary embodiments, and instead may be applied to variously modified modes without departing from the spirit and the scope thereof. For example, in the above-described exemplary embodiments, the exemplary evaluation to determine whether or not the text font is suitable, and the exemplary evaluation of the enhancement state after the image processing are described as examples of evaluation based on sensitivity of the images. In addition, when producing a display of text, a drawing, and so forth on the display screen of an information apparatus or the like, the present invention can also be used as an index to determine what image should be used to produce the most suitable display corresponding to the size of the display screen or the resolution. Thus, the present invention can be used for a wide variety of fields.

Further, the present invention provides a processing program including processing steps to achieve the above-described present invention are written, and can store the processing program on a recording medium, such as a floppy disc, an optical disc, and a hard disc. The present invention includes the recording medium on which the processing program is recorded. Further, it may be arranged that the processing program can be obtained from a network.

As has been described, according to the present invention, the induction field in vision is calculated for the unit of images for evaluation, and the evaluation based on sensitivity of the images is performed based on the magnitude of the potential value calculated from the obtained induction field in vision. Subsequently, the impression strength of the images, which acts as the index of the evaluation based on sensitivity, can be expressed by quantity. Therefore, the image evaluation can be used for many fields, e.g., optimization of the font design of text and the design of a drawing and a picture, which have been performed by using the sensibility and the manual work of a person, or evaluation of image quality, which is performed after image processing, such as edge enhancement or gamma correction.

Further, the induction-filed energy is calculated based on the potential value, and the evaluation based on sensitivity for the image for evaluation is performed corresponding to the magnitude of the induction-field energy. Therefore, the degree of the impression strength of the image, which is the index of the evaluation based on sensitivity, can be properly expressed.

The invention claimed is:

1. An image-evaluation method to perform evaluation based on sensitivity of an image for evaluation, comprising:
    calculating an induction field in vision of the image for evaluation; and
    performing the evaluation based on sensitivity of the image for evaluation on the basis of a magnitude of a potential value obtained from the calculated induction field in vision, the performing the evaluation based on sensitivity on the basis of the magnitude of the potential value including obtaining induction-field energy on the basis of the potential value and performing the evaluation based on sensitivity of the image for evaluation according to the magnitude of the induction-field energy.

2. The image-evaluation method according to claim 1, further including:
    obtaining the induction-field energy based on the potential value by multiplying the area of a plane surrounded with an equipotential line, which is obtained from the induction field in vision, by the potential value of the equipotential line, performing the calculation for each equipotential line, and obtaining the total sum of the calculation.

3. The image-evaluation method according to claim 1, the performing the evaluation based on sensitivity of the image for evaluation further including:
    obtaining the induction-field energy, comparing the obtained induction-field energy with a predetermined reference induction-field energy, and performing the evaluation based on sensitivity of the image for evaluation on the basis of the comparison result.

4. An image-evaluation system to perform evaluation based on sensitivity of an image for evaluation, comprising:
    an induction-field-in-vision calculation device to calculate an induction field in vision of the image for evaluation; and an image-evaluation-based-on-sensitivity device to perform the evaluation based on sensitivity of the image for evaluation on the basis of a magnitude of a potential value obtained from the induction field in vision obtained by the induction-field-in-vision calculation device, the processing performed by the image-evaluation-based-on-sensitivity device to perform the evaluation based on sensitivity on the basis of the magnitude of the potential value including obtaining the induction-field energy on the basis of the potential value, and performing the evaluation based on sensitivity of the image for evaluation according to the magnitude of the induction-field energy.

5. The image-evaluation system according to claim 4, the induction-field energy based on the potential value being obtained by multiplying the area of a plane surrounded with an equipotential line, which is obtained from the induction field in vision, by the potential value of the equipotential line, performing the calculation for each equipotential line, and obtaining the total sum of the calculation.

6. An image-evaluation system according to claim 4, the processing performed by the image-evaluation-based-on-sensitivity device to perform the evaluation based on sensitivity of the image for evaluation further including:
obtaining the induction-field energy for the image for evaluation, comparing the obtained induction-field energy with a predetermined reference induction-field energy, and performing the evaluation based on sensitivity of the image for evaluation on the basis of the comparison result.

7. An image-evaluation-processing program recorded on a computer readable recording medium to perform evaluation based on sensitivity for an image for evaluation, the image-evaluation-processing program comprising:

a program for calculating an induction field in vision of the image for evaluation; and a program for performing the evaluation based on sensitivity of the image for evaluation on the basis of the magnitude of a potential value obtained from the induction field in vision, the program for performing the evaluation based on sensitivity on the basis of the magnitude of the potential value including a program for obtaining the induction-field energy on the basis of the potential value, and a program for performing the evaluation based on sensitivity of the image for evaluation according to the magnitude of the induction-field energy.

8. The image-evaluation-processing program according to claim 7, further including:
a program for obtaining the induction-field energy based on the potential value by multiplying the area of a plane surrounded with an equipotential line, which is obtained from the induction field in vision, by the potential value of the equipotential line, performing the calculation for each equipotential line, and obtaining the total sum of the calculation.

9. The image-evaluation-processing program according to claim 7, the program for performing the evaluation based on sensitivity of the image for evaluation further including:
a program for obtaining the induction-field energy for the image for evaluation, a program for comparing the obtained induction-field energy with a predetermined reference induction-field energy, and a program for performing the evaluation based on sensitivity of the image for evaluation on the basis of the comparison result.

* * * * *